US010602017B2

(12) United States Patent
Nakabayashi

(10) Patent No.: US 10,602,017 B2
(45) Date of Patent: Mar. 24, 2020

(54) FILE MANAGEMENT APPARATUS, MULTIFUNCTION DEVICE AND INFORMATION PROCESSING APPARATUS, FILE MANAGEMENT METHOD, AND FILE MANAGEMENT PROGRAM

(71) Applicant: SHARP KABUSHIKI KAISHA, Sakai, Osaka (JP)

(72) Inventor: Makoto Nakabayashi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/134,835

(22) Filed: Sep. 18, 2018

(65) Prior Publication Data
US 2019/0089864 A1 Mar. 21, 2019

(30) Foreign Application Priority Data
Sep. 19, 2017 (JP) .................. 2017-178500

(51) Int. Cl.
*H04N 1/32* (2006.01)
*G06F 17/30* (2006.01)
*H04N 1/21* (2006.01)
*G06F 16/11* (2019.01)

(52) U.S. Cl.
CPC ....... *H04N 1/32395* (2013.01); *G06F 16/125* (2019.01); *H04N 1/217* (2013.01); *H04N 1/32448* (2013.01)

(58) Field of Classification Search
CPC ............... H04N 1/32395; H04N 1/217; H04N 1/32448; G06F 16/125

USPC ........................................ 358/1.15
See application file for complete search history.

(56) References Cited

U.S. PATENT DOCUMENTS

| 6,915,265 B1* | 7/2005 | Johnson | G06F 19/328 705/2 |
| 8,495,191 B2* | 7/2013 | Numata | G06Q 10/06 709/223 |
| 10,140,112 B2* | 11/2018 | Takano | G06F 8/65 |
| 2002/0099633 A1* | 7/2002 | Bray | G06F 17/211 705/35 |
| 2008/0123857 A1* | 5/2008 | Okiyama | G06F 21/10 380/277 |
| 2015/0213103 A1* | 7/2015 | Sato | H04L 67/1097 707/613 |

(Continued)

FOREIGN PATENT DOCUMENTS

JP     2006-085452 A     3/2006

*Primary Examiner* — Allen H Nguyen
(74) *Attorney, Agent, or Firm* — ScienBiziP, P.C.

(57) ABSTRACT

A file management apparatus causes notification destinations, which receive download information, to download a file recorded in a recording medium, in accordance with requests from the notification destinations. The apparatus includes an initial-deletion-time setting unit, a deletion-time updating unit, and a first file deleting unit. The initial-deletion-time setting unit sets a given time as the initial value of the deletion time of the file. The deletion-time updating unit updates the deletion time if one or more notification destinations having not downloaded the file are present when the deletion time comes. The first file deleting unit deletes the file under the condition that, when the deletion time comes, the one or more notification destinations having not downloaded the file are not present.

23 Claims, 13 Drawing Sheets

(56) References Cited

U.S. PATENT DOCUMENTS

2018/0024787 A1* 1/2018 Sakawaki ............ G06F 3/1225
358/1.15

\* cited by examiner

FILE MANAGEMENT APPARATUS, MULTIFUNCTION DEVICE AND INFORMATION PROCESSING APPARATUS, FILE MANAGEMENT METHOD, AND FILE MANAGEMENT PROGRAM

BACKGROUND

1. Field

The present disclosure relates to a file management apparatus, a multifunction device and an information processing apparatus which include the file management apparatus, a file management method, and a file management program.

2. Description of the Related Art

Many multifunction devices have a scanner function. A file may be created from document data obtained through scanning using the scanner function, and may be stored in a storage device provided inside or outside a multifunction device. A function named "Scan to uniform resource locator (URL)" is known. This function is such that a notification about URL for accessing an image data file of a scanned document is transmitted through electronic mail (URL notification mail) to a user who wants the notification. A user who receives the URL notification mail selects the URL described in the mail body. Thus, the user may display or download the image data file.

To improve the security of a document data file, some multifunction devices have a function in which, when a storage period has elapsed, the document data is deleted from the storage device.

Japanese Unexamined Patent Application Publication No. 2006-85452 describes the following disclosure. When the end of a storage period comes close, a user is notified, through electronic mail, that image data is scheduled to be deleted. After that, when a reply mail is received from the user, the storage period is updated. However, in this disclosure, to update the storage period, the apparatus transmits an electronic mail to the user, who then replies to the apparatus. Even in the state in which the user wants to update the storage period, if the electronic mail from the apparatus to the user and the user's reply fail to be transmitted due to some reason, the user fails to update the storage period. For example, if the user who is a not destination is in a state in which an electronic mail fails to be received, or if the communication line is in bad condition, such a case may occur.

SUMMARY

It is desirable to provide a file management apparatus, a multifunction device and an information processing apparatus including the file management apparatus, a file management method, and a file management program which enable a user, who has failed to obtain a file when the storage period of the file ends, to obtain the file after the end of the storage period.

According to a first aspect of the disclosure, there is provided a file management apparatus causing at least one notification destination to download a file recorded in a recording medium. The downloading is performed in accordance with a request from the at least one notification destination. The at least one notification destination receives a notification about download information. The apparatus includes an initial-deletion-time setting unit, a deletion-time updating unit, and a first file deleting unit. The initial-deletion-time setting unit sets a given time as an initial value of a deletion time of the file. The deletion-time updating unit updates the deletion time if one or more notification destinations having not downloaded the file are present when the deletion time comes. The one or more notification destinations having not downloaded the file are included in the at least one notification destination. The first file deleting unit deletes the file under a condition that, when the deletion time comes, the one or more notification destinations having not downloaded the file are not present.

According to a second aspect of the disclosure, there is provided a file management method for causing at least one notification destination to download a file recorded in a recording medium. The downloading is performed in accordance with a request from the at least one notification destination. The at least one notification destination receives a notification about download information. The method includes setting a given time as an initial value of a deletion time of the file; updating the deletion time if one or more notification destinations having not downloaded the file are present when the deletion time comes, the one or more notification destinations having not downloaded the file being included in the at least one notification destination; and deleting the file under a condition, the condition being that, when the deletion time comes, the one or more notification destinations having not downloaded the file are not present.

DESCRIPTION OF THE EMBODIMENTS

Embodiments for carrying out the present disclosure will be described in detail below with reference to the drawings.

First Embodiment

Figure 1:
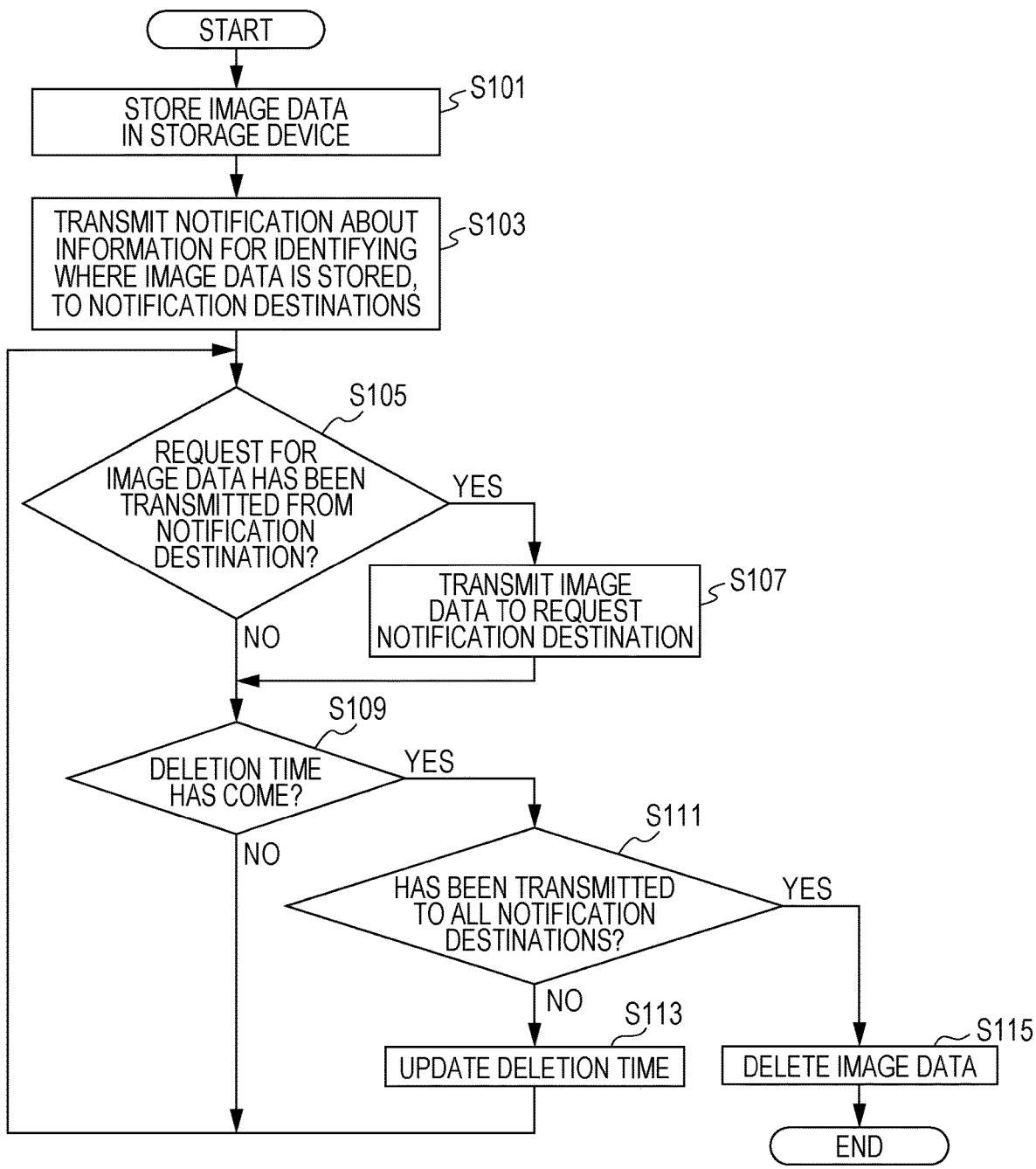
FIG. 1 is a flowchart for describing a file management method according to a first embodiment of the present disclosure.

FIG. 1 is a flowchart for describing a file management method according to a first embodiment.

Referring to FIG. 1, image data is stored in a storage device (step S101). The storage device is, for example, included in a multifunction device. Alternatively, the storage device which is present outside the multifunction device may be accessed from the multifunction device.

Then, a notification about information for identifying where image data is stored is transmitted to notification destinations (step S103). For example, a uniform resource locator (URL) indicating the storage destination is used as information for identifying where image data is stored. The notification may be transmitted by using electronic mail. Alternatively, another notification method may be used. One or more notification destinations are present.

If a request for the image data has been transmitted from any notification destination notified in step S103 (YES in step S105), the image data is transmitted to the notification destination from which the request has been transmitted (step S107). Then, the process proceeds to step S109.

If no requests for the image data have been transmitted from any notification destinations notified in step S103 (NO in step S105), the process proceeds directly to step S109.

If a deletion time has not come (NO in step S109), the process returns to step S105.

The deletion time indicates a time at which the image data is scheduled to be deleted. The initial value of the deletion time may be set no a time at which a given period has elapsed after the image data is stored in the storage device. Alternatively, the initial value of the deletion time may be set no a time at which a given period has elapsed after the image data is made downloadable. Alternatively, the initial value of the deletion time may be set to another time. The deletion time may be updated.

If the deletion time has come (YES in step S109), it is checked if the image data has been transmitted to all of the notification destinations. If the check result is NO (NO in step S111), the deletion time is updated (step S113), and the process returns to step S105. If the check result is YES (YES in step S111), the image data is deleted (step S115).

To check if the image data has been transmitted to all of the notification destinations, notification destinations which have transmitted a request for the image data are to be identified. To identify such notification destinations, for example, when a request for the image data is received, a login authentication screen may be transmitted to the request source, and user identification information which is transmitted along with the password through the screen from the request source may be used. Alternatively, to identify such notification destinations, information for identifying a notification destination may be added to the URL (information for identifying where image data is stored) transmitted in step S103, and a request for the image data which is received in step S105 may include the information.

Not only image data stored in a storage device but also a typical file stored in a storage device may be a target to be processed.

Therefore, if the image data has been transmitted to all of the notification destinations when the initial deletion time comes, the image data is deleted, decreasing possibility of lack of free space in the storage device. Further, unless the image data has been transmitted to all of the notification destinations when the initial deletion time comes, the deletion time is updated so that the image data may be transmitted to the remaining notification destinations. The update of the deletion time is repeatedly performed. Thus, transmission of the image data to all of the notification destinations may be completed. In addition, since the image data remains in the storage device in a minimal period, unnecessary lack of free space of the storage device may be avoided. In any operation described above, a security problem caused by the state in which not-deleted image data remains may be avoided.

Second Embodiment

Figure 2:
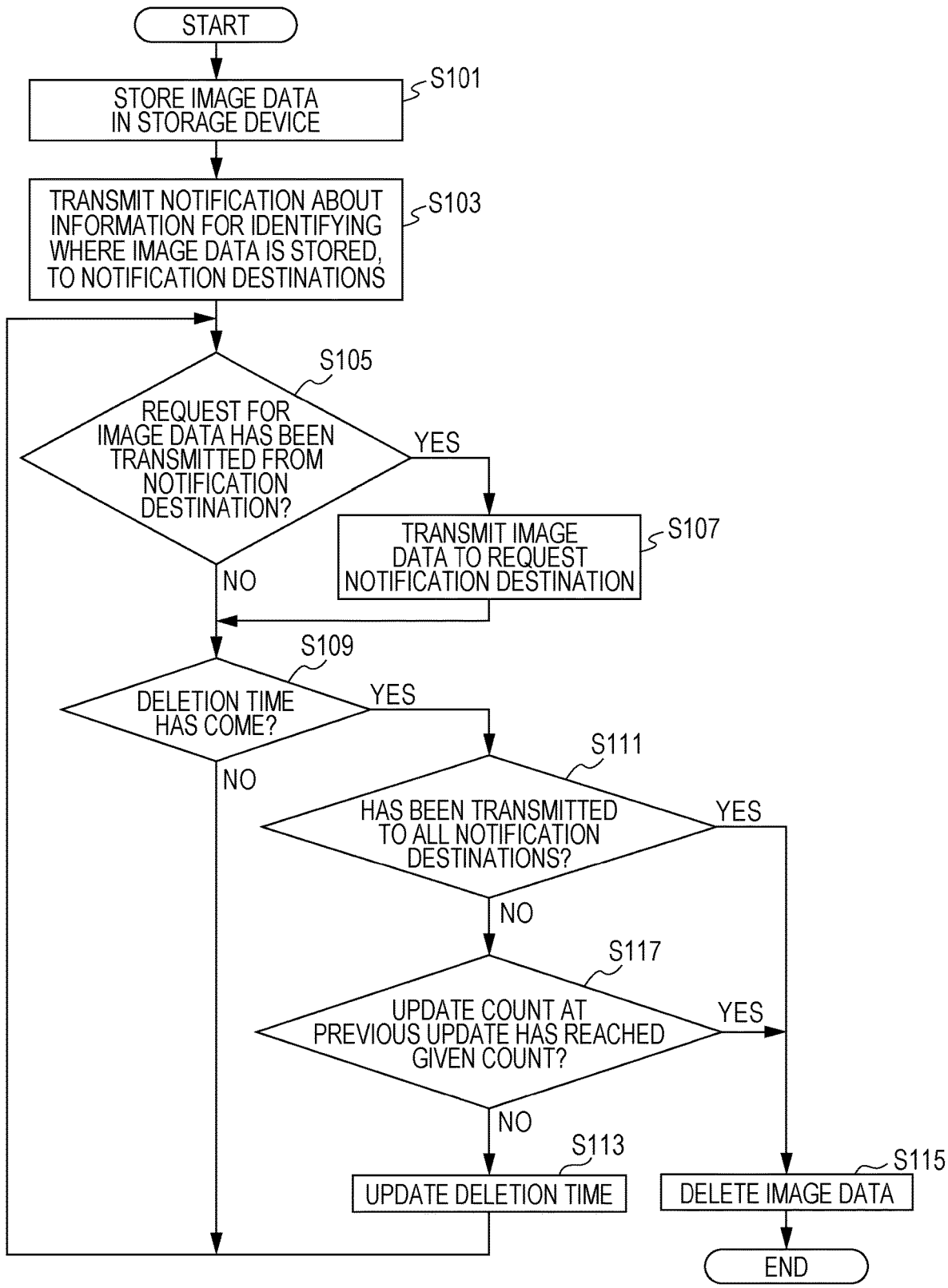
FIG. 2 is a flowchart for describing a file management method according to a second embodiment of the present disclosure.

FIG. 2 is a flowchart for describing a file management method according to a second embodiment.

As is clear from the comparison between FIG. 1 and FIG. 2, the second embodiment is different from the first embodiment only in the following point.

In the first embodiment, when the deletion time comes (YES in step S109), if transmission of the image data to all of the notification destinations has not been completed (NO in step S111), the process simply proceeds to step S113 in which the deletion time is updated. In contrast, in the second embodiment, when the deletion time comes (YES in step S109), it transmission of the image data to all of the notification destinations has not been completed (NO in step S111), the update of the deletion time is not simply performed. It is determined whether or not the update count at the previous update has already reached a given count (step S117). If the update count has not reached the given count (NO in step S117), the deletion time is updated again (step S113). If the update count has reached the given count (YES in step S117), the deletion time is not updated, and the image data is deleted (step S115).

In step S113, if the update count at this update has reached the given count, at least notification destinations, which have not downloaded the image data, may be notified that the image data is scheduled to be deleted at the deletion time that has been updated in this update.

Therefore, for example, when there is a notification destination person who does not have a time to download the image data because the notification destination person is on a long business trip, lack of free space of the storage device due to unnecessary update of the deletion time may be avoided.

Third Embodiment

Figure 3:
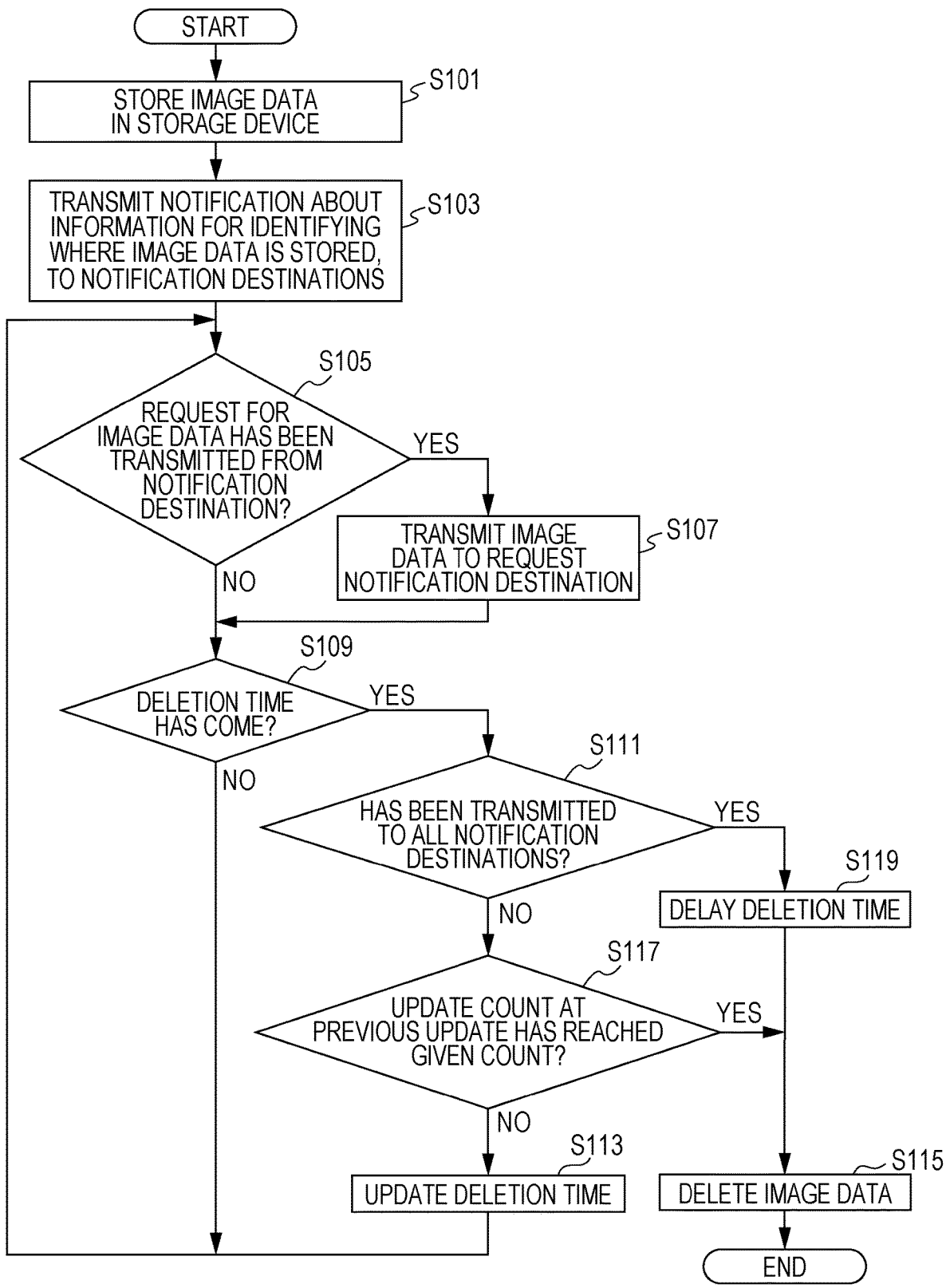
FIG. 3 is a flowchart for describing a file management method according to a third embodiment of the present disclosure.

FIG. 3 is a flowchart for describing a file management method according to a third embodiment.

As is clear from the comparison between FIG. 2 and FIG. 3, the third embodiment is different from the second embodiment only in the following point.

In the second embodiment, when the deletion time comes (YES in step S109), if transmission of the image data to ail of the notification destinations has been completed (YES in step S111), the image data is immediately deleted (step S115). In contrast, in the third embodiment, when the deletion time comes (YES in step S109), if transmission of the image data to all of the notification destinations has been completed (YES in step S111), the deletion time is delayed (step S119), and the image data is deleted (step S115).

In FIG. 3, if the determination result is YES in step S117, the process immediately proceeds to step S115. Alternatively, if the determination result is YES in step S117, the deletion time may be delayed, and the process may proceed to step 115. That is, if the update count at the previous update has already reached the given count, the image data may be deleted after the process waits a given period.

Therefore, a person who has already received the image data may receive the image data again. In addition, if the notification destinations having been notified in step S103 are notified of the updated scheduled deletion time, the notification destinations may grasp a time until which the notification destinations may receive the image data again. The update at which the update count is equal to the given count is the last executable update. The deletion time after the last update is the latest deletion time. The updated time may be transmitted at a time at which the update at which the update count is equal to the given count is performed, or at a different time.

Only when the deletion time is not updated, step S119 may be performed. Alternatively, only when the update count is less than the given count, step S119 may be performed.

Fourth Embodiment

Figure 4:
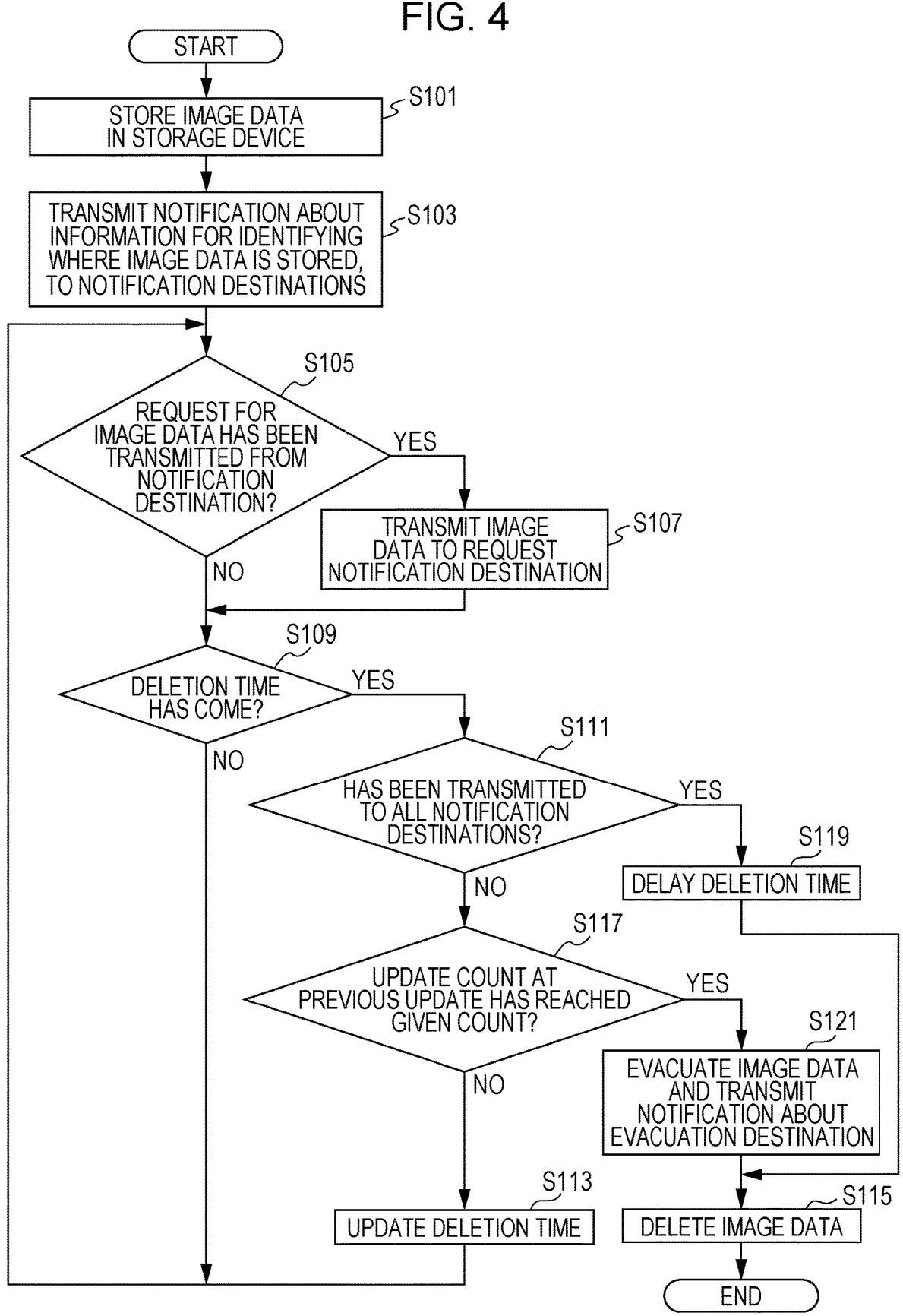
FIG. 4 is a flowchart for describing a file management method according to a fourth embodiment of the present disclosure.

FIG. 4 is a flowchart for describing a file management method according to a fourth embodiment.

As is clear from the comparison between FIG. 3 and FIG. 4, the fourth embodiment is different from the third embodiment only in the following point.

In the third embodiment, when the deletion time comes (YES in step S109), if transmission of the image data to all of the notification destinations has not been completed (NO in step S111), it is determined whether or not the update count has already reached the given count (step S117). If the update count has reached the given count (YES in step S117), the image data is simply deleted (step S115). In contrast, in the fourth embodiment, when the deletion time comes (YES in step S109), if transmission of the image data to all of the notification destinations has not been completed (NO in step S111), it is determined whether or not the update count has already reached the given count (step S117). If the update count has reached the given count (YES in step S117), the image data is evacuated, and the notification destinations having been notified in step S103 are notified of the evacuation destination (step S121). Then, the image data is deleted (step S115). However, when the notification destinations know the evacuation destination even without a notification about the evacuation destination (for example, when the evacuation destination is determined according to a given rule), the notification about the evacuation destination may be skipped.

The evacuation destination of the image data is, for example, a storage device or an information processing apparatus connected to the multifunction device over a network.

Therefore, even when the notification destinations having been notified in step S103 fail to obtain the image data from the storage device which is the first storage destination, the notification destinations may voluntarily obtain the image data from the evacuation destination later. The notification destinations notified of the evacuation destination in step S121 may be only persons who have not obtained the image data.

Fifth Embodiment

Figure 5:
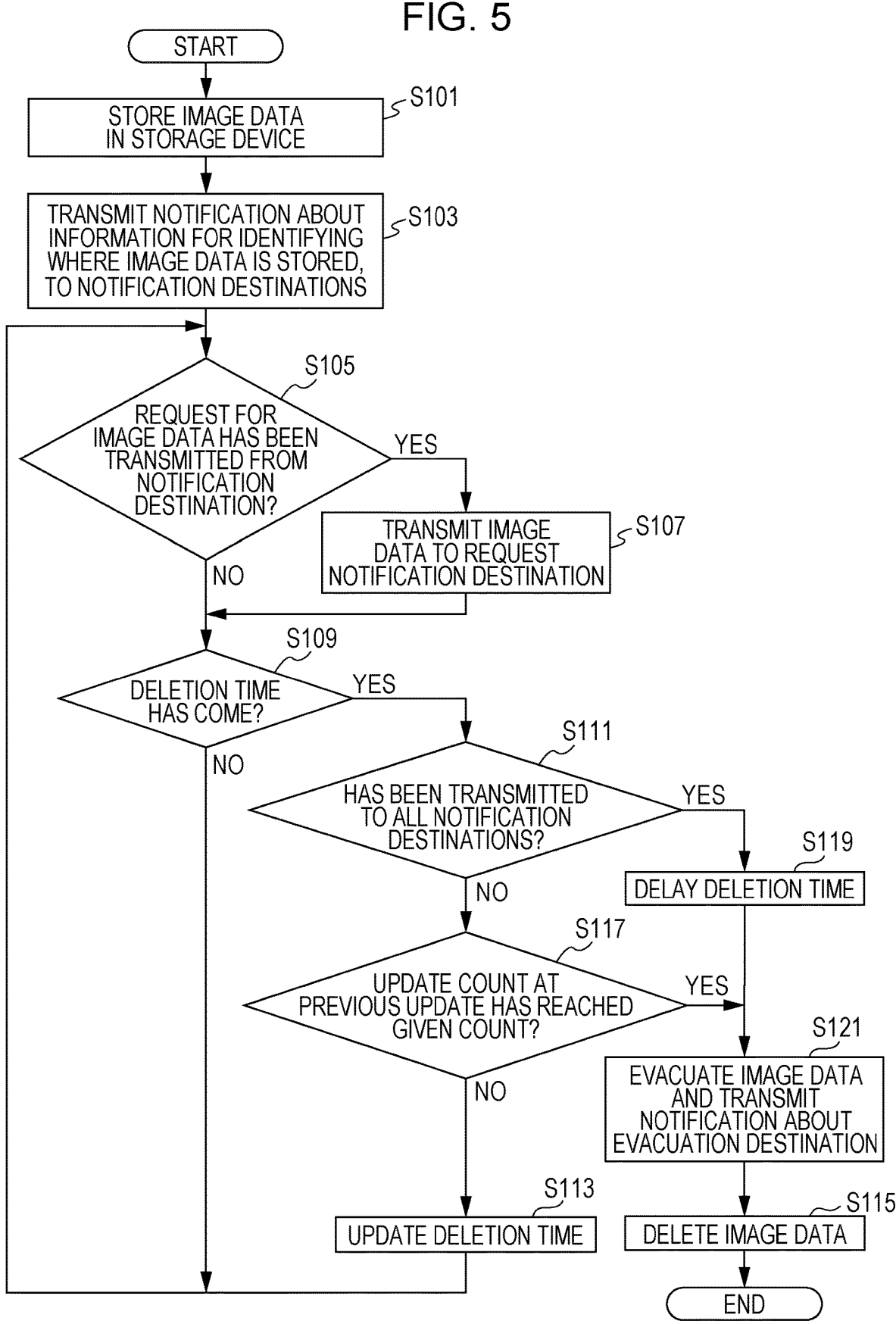
FIG. 5 is a flowchart for describing a file management method according to a fifth embodiment of the present disclosure.

FIG. 5 is a flowchart for describing a file management method according to a fifth embodiment.

As is clear from the comparison between FIG. 4 and FIG. 5, the fifth embodiment is different from the fourth embodiment only in the following point.

In the fourth embodiment, when the deletion time comes (YES in step S109), if transmission of the image data to all of the notification destinations has been completed (YES in step S111), the deletion time is delayed by a given period (step S119), and the image data is simply deleted (step S115). In contrast, in the fifth embodiment, when the deletion time comes (YES in step S109), if transmission of the image data to all of the notification destinations has been completed (YES in step S111), the deletion time is delayed by the given period (step S119), and the image data is evacuated. Then, the notification destinations having been notified in step S103 are notified of the evacuation destination (step S121), and the image data is deleted (step S115).

In the fourth embodiment, only when transmission of the image data to all of the notification destinations has not been completed, the image data is evacuated and a notification about the evacuation destination is transmitted. This process is performed especially in consideration of persons who have not received the image data. In contrast, in the fifth embodiment, also when transmission of the image data to all of the notification destinations has been completed, the image data is evacuated, and a notification about the evacuation destination is transmitted. In this process, especially, not only persons who have not received the image data, but also persons who have received the image data may obtain the same image data from the evacuation destination.

Sixth Embodiment

Figure 6:
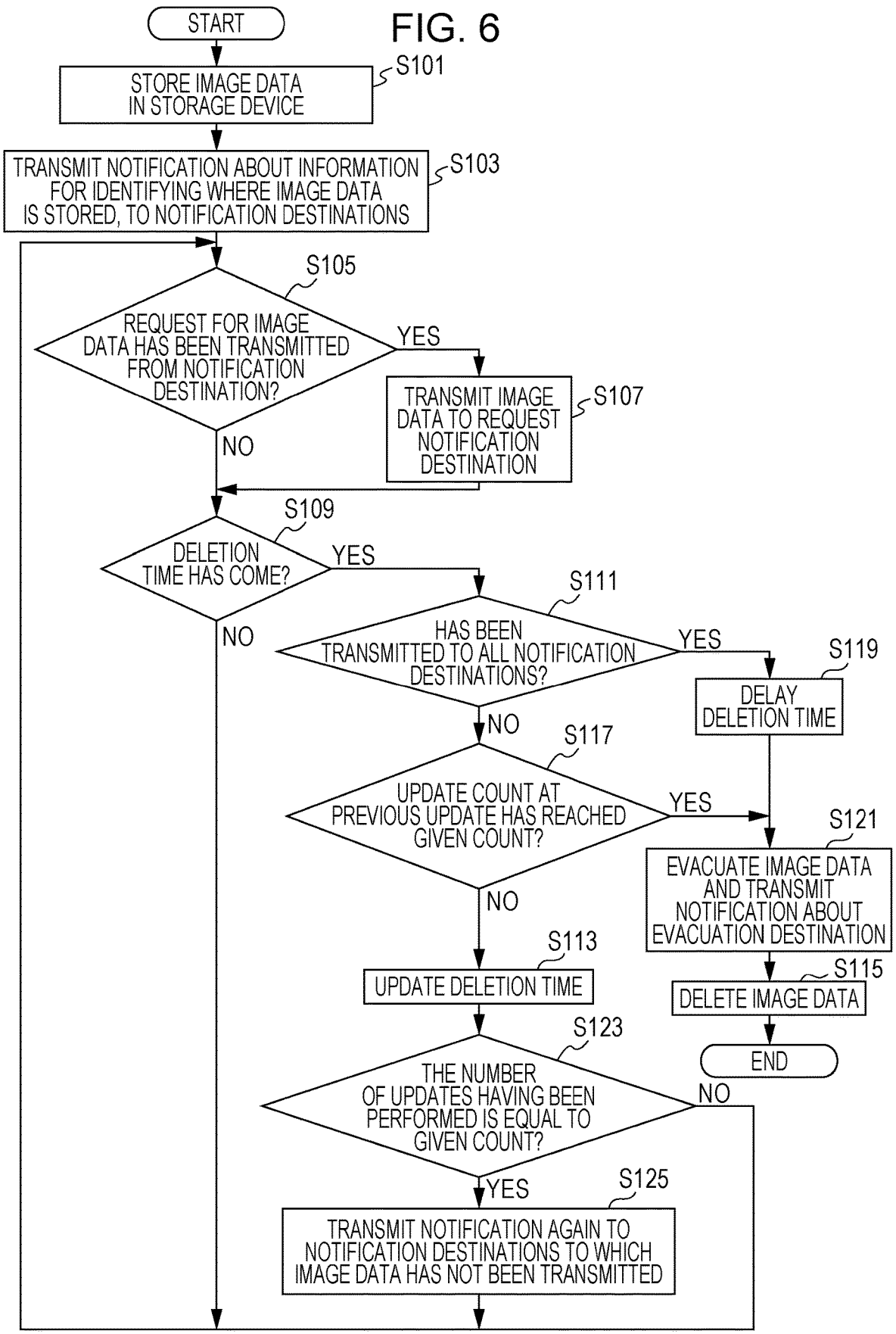
FIG. 6 is a flowchart for describing a file management method according to a sixth embodiment of the present disclosure.

FIG. 6 is a flowchart for describing a file management method according to a sixth embodiment.

As is clear from the comparison between FIG. 5 and FIG. 6, the sixth embodiment is different from the fifth embodiment only in the following point.

In the fifth embodiment, when the deletion time comes (YES in step S109), it transmission of the image data to all of the notification destinations has not been completed (NO in step S111), the deletion time is not simply updated. It is determined whether or not the update count has already reached the given count (step S117). If the update count has not reached the given count (NO in step S117), the deletion time is updated again (step S113). If the update count has reached the given count (YES in step S117), the deletion time is not updated again. The image data is evacuated, and a notification about the evacuation destination is transmitted (step S121). Then, the image data is deleted (step S115). In contrast, in the sixth embodiment, if the deletion time is updated (step S113), it is checked if the number of updates having been performed is equal to the given count if the check result is YES (YES in step S123), a notification is transmitted again to the notification destinations to which the image data has not been transmitted (step S125). This notification describes the scheduled time at which the image data is to be deleted.

Therefore, according to the sixth embodiment, the second notification may increase possibility in which, before the update count has reached the given count and the image data is deleted, persons which have not received the image data may obtain the image data.

Seventh Embodiment

Figure 7:
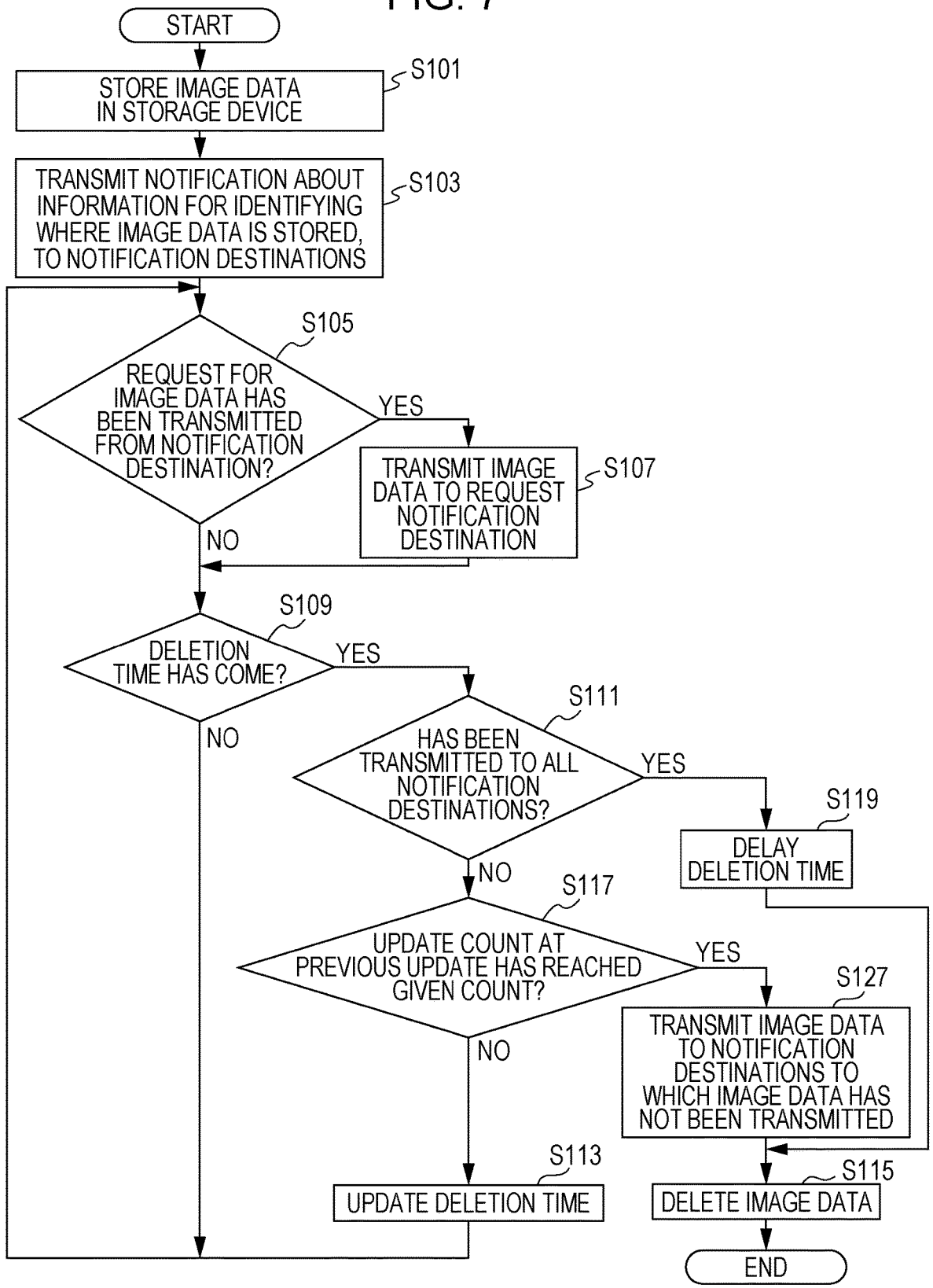
FIG. 7 is a flowchart for describing a file management method according to a seventh embodiment of the present disclosure.

FIG. 7 is a flowchart for describing a file management method according to a seventh embodiment.

As is clear from the comparison between FIG. 4 and FIG. 7, the seventh embodiment is different from the fourth embodiment only in the following point.

In the fourth embodiment, when the deletion time comes (YES in step S109), if transmission of the image data to all of the notification destinations has not been completed (NO in step S111), it is determined whether or not the update count has already reached the given count (step S117). If the update count has reached the given count (YES in step S117), the image data is evacuated, and the notification destinations having been notified in step S103 are notified of the evacuation destination (step S121). Then, the image data is deleted (step S115). In contrast, in the seventh embodiment, when the deletion time comes (YES in step S109) if transmission of the image data to all of the notification destinations has not been completed (NO in step S111), it is determined whether or not the update count has already reached the given count (step S117). If the update count has reached the given count (YES in step S117), the image data itself is transmitted to the notification destinations to which the image data has not been transmitted (step S127), and the image data is deleted (step S115).

Therefore, according to the seventh embodiment, while the image data is deleted from the storage device, the image data may be transmitted to all of the notification destinations with certainty.

Eighth Embodiment

Figure 8:
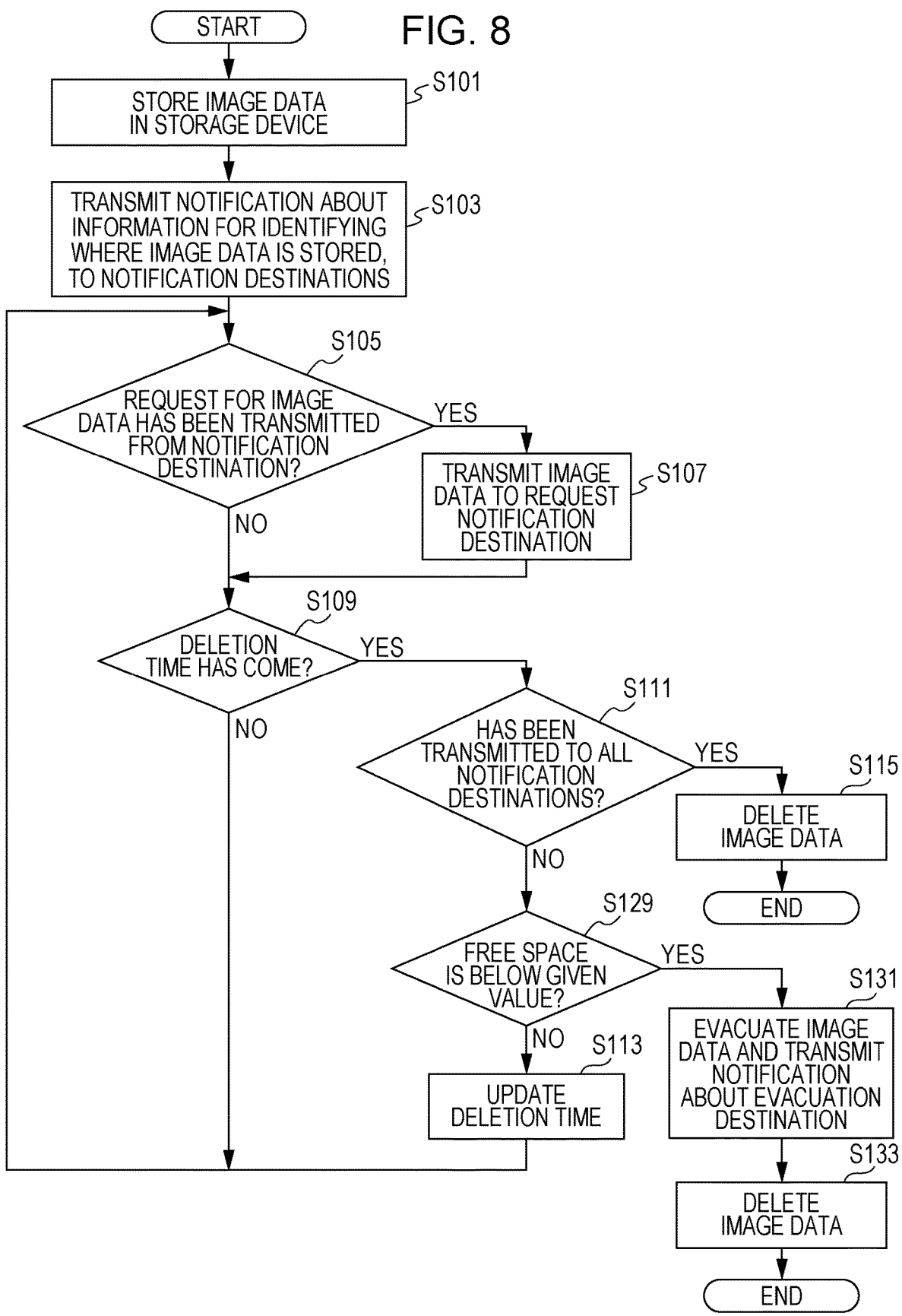
FIG. 8 is a flowchart for describing a file management method according to an eighth embodiment of the present disclosure.

FIG. 8 is a flowchart for describing a file management method according an eighth embodiment.

As is clear from the comparison between FIG. 1 and FIG. 8, the eighth embodiment is different from the first embodiment only in the following point.

In the first embodiment, when the deletion time comes (YES in step S109), it is checked if the image data has been transmitted to all of the notification destinations. If the image data has not been transmitted to all of the notification destinations, (NO in step S111), the deletion time is updated (step S113). In contrast, in the eighth embodiment, when the deletion time comes (YES in step S109), it is checked if the image data has been transmitted to all of the notification destinations. If the image data has not been transmitted to all of the notification destinations (NO in step S111), it is checked if the free space of the storage device is below a given value. If the free space of the storage device is not below the given value (NO in step S129), the deletion time is updated (step S113). If the free space of the storage device is below the given value (YES in step S129), the image data is evacuated, and the notification destinations which have been notified in step S103 and to which the image data has not been transmitted are notified of the evacuation destination (step S131). Then, the image data is deleted (step S133). Alternatively, all of the notification destinations having been notified in step S103 may be notified of the evacuation destination.

The given value used for the determination about the free space of the storage device may be set or changed, for example, by an administrator of the multifunction device.

The process in step S133 may be skipped. In addition, step S117 illustrated in FIG. 2 may be inserted between step S111 and step S129. Like the second embodiment, if the update count has already reached the given count in step S117, the image data may be deleted.

Therefore, a free space equal to or more than the given value may be allocated as the free space of the storage device. The state in which new image data fails to be stored in the storage device may be avoided. In addition, even when the current image data is deleted to allocate a free space, the notification destinations having been notified in step S103 may voluntarily obtain the image data from the evacuation destination.

Ninth Embodiment

Figure 9:
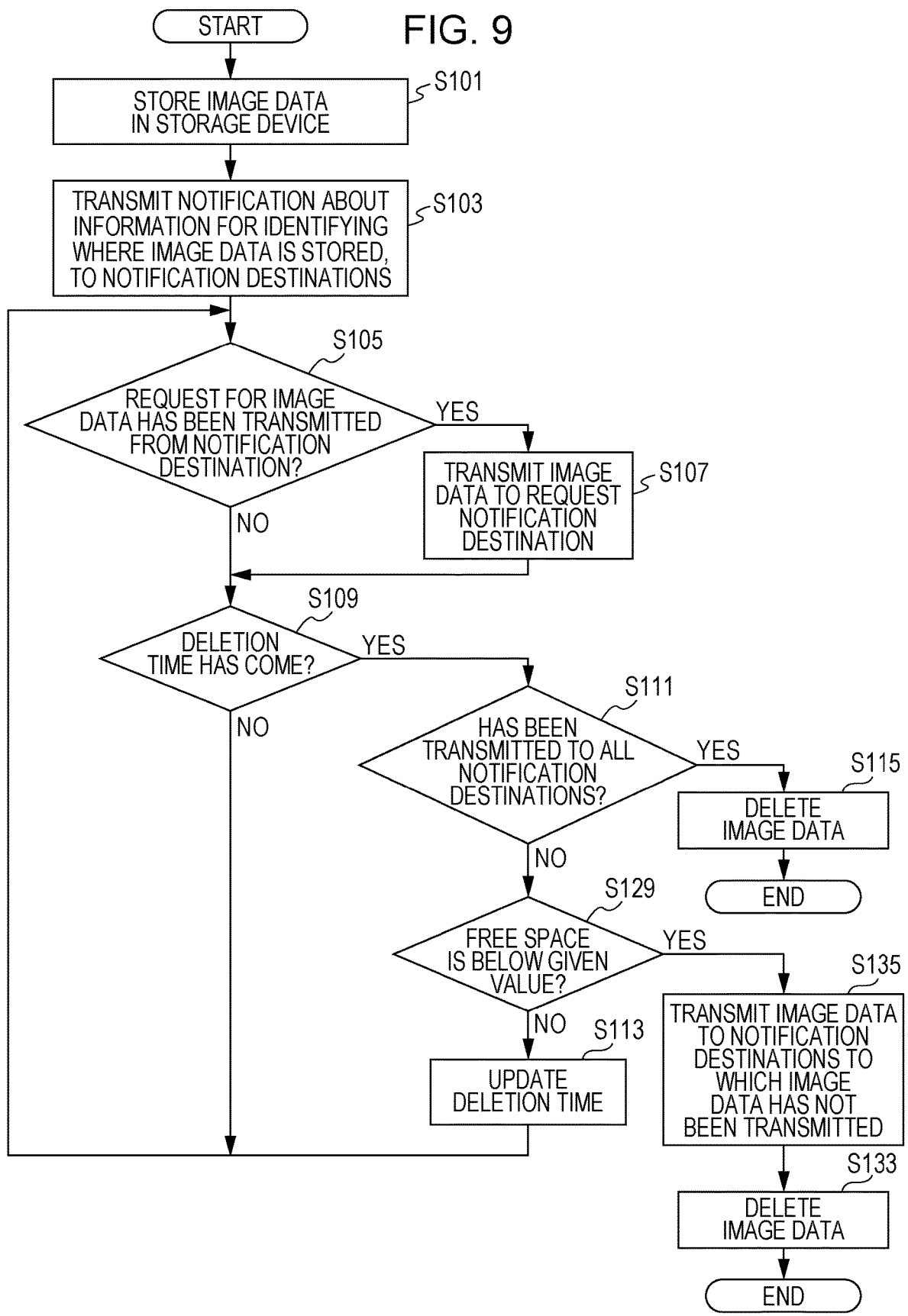
FIG. 9 is a flowchart for describing a file management method according to a ninth embodiment of the present disclosure.

FIG. 9 is a flowchart for describing a file management method according to a ninth embodiment.

As is clear from the comparison between FIG. 8 and FIG. 9, the ninth embodiment is different from the eighth embodiment only in the following point.

In the eighth embodiment, when the deletion time comes (YES in step S109), it is checked if the image data has been transmitted to all of the notification destinations. If the image data has not been transmitted to all of the notification destinations (NO in step S111), it is checked if the free space of the storage device is below the given value. If the free space of the storage device is not below the given value (NO in step S129), the deletion time is updated (step S113). If the free space of the storage device is below the given value (YES in step S129), the image data is evacuated, and the notification destinations which have been notified in step S103 and to which the image data has not been transmitted are notified of the evacuation destination (step S131). Then, the image data is deleted (step S133). In contrast, in the ninth embodiment, when the deletion time comes (YES in step S109), it is checked if the image data has been transmitted to all of the notification destinations. If the image data has not been transmitted to all of the notification destinations (NO in step S111), it is checked if the free space of the storage device is below the given value. If the free space of the storage device is not below the given value (NO in step S129), the deletion time is updated (step S113). If the free space of the storage device is below the given value (YES in step S129), the image data is transmitted to the persons to whom the image data has not been transmitted (step S135), and the image data is deleted (step S133).

Therefore, a free space equal to or more than the given value may be allocated as the free space of the storage device. Accordingly, the state in which new image data fails to be stored in the storage device may be avoided. In addition, even when the current image data is deleted to allocate a free space, the persons who have not received the image data may receive the image data with certainty.

Tenth Embodiment

Figure 10:
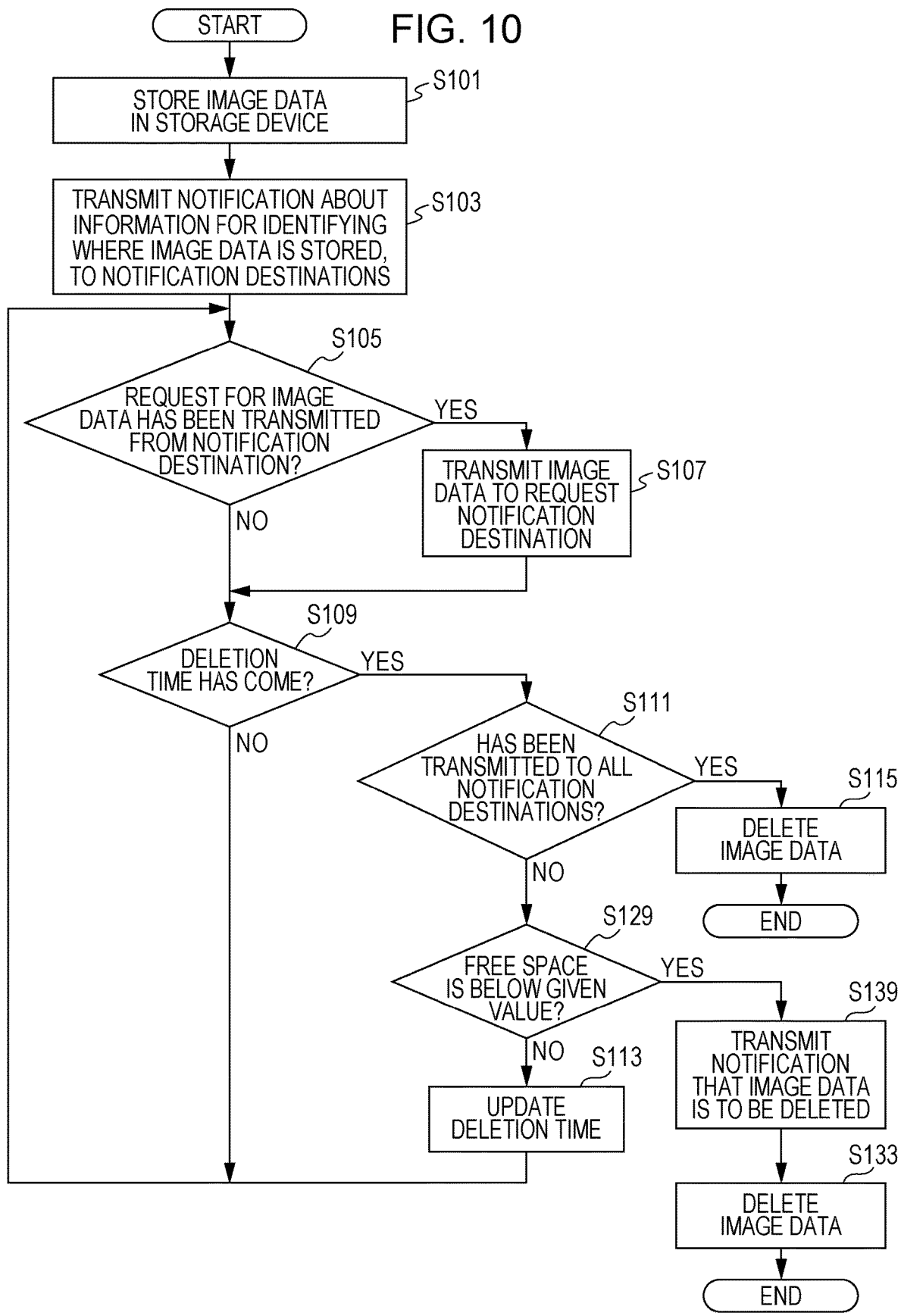
FIG. 10 is a flowchart for describing a file management method according to a tenth embodiment of the present disclosure.

FIG. 10 is a flowchart for describing a file management method according to a tenth embodiment.

As is clear from the comparison between FIG. 8 and FIG. 10, the tenth embodiment is different from the eighth embodiment only in the following point.

In the eighth embodiment, when the deletion time comes (YES in step S109), it is checked if the image data has been transmitted to all at the notification destinations. If the image data has not been transmitted to all of the notification destinations (NO in step S111), it is checked if the free space of the storage device is below the given value. If the free space of the storage device is not below the given value (NO in step S129), the deletion time is updated (step S113). If the free space of the storage device is below the given value (YES in step S129), the image data is evacuated, and the notification destinations which have been notified in step S103 and to which the image data has not been transmitted are notified of the evacuation destination. (step S131). Then, the image data is deleted (step S133). In contrast, in the tenth embodiment, when the deletion time comes (YES in step S109), it is checked if the image data has been transmitted to all of the notification destinations. If the image data has not been transmitted to all of the notification destinations (NO in step S111), it is checked if the free space of the storage device is below the given value. If the free space of the storage device is not below the given value (NO in step S129), the deletion time is updated (step S113). If the free space of the storage device is below the given value (YES in step S129), the persons to whom the image data has not been transmitted are notified that the image data is to be deleted (step S139). Then, if a given time has elapsed after that, the image data is deleted (step S133).

Therefore, a free space equal to or more than the given value may be allocated as the free space of the storage device. Accordingly, the state in which new image data fails to be stored in the storage device may be avoided. In addition, even when the current image data is deleted to allocate a free space, the notification transmitted in step S139 enables the persons, who have not received the image data, to have an opportunity of downloading the image data during the given time after the notification.

Eleventh Embodiment

As notification destinations, in addition to normal notification destinations, there are C. C notification destinations and B. C. C. notification destinations. The target to which the above-described embodiments are applied may be all of these notification destinations, or may be only the normal notification destinations.

Twelfth Embodiment

Figure 11:
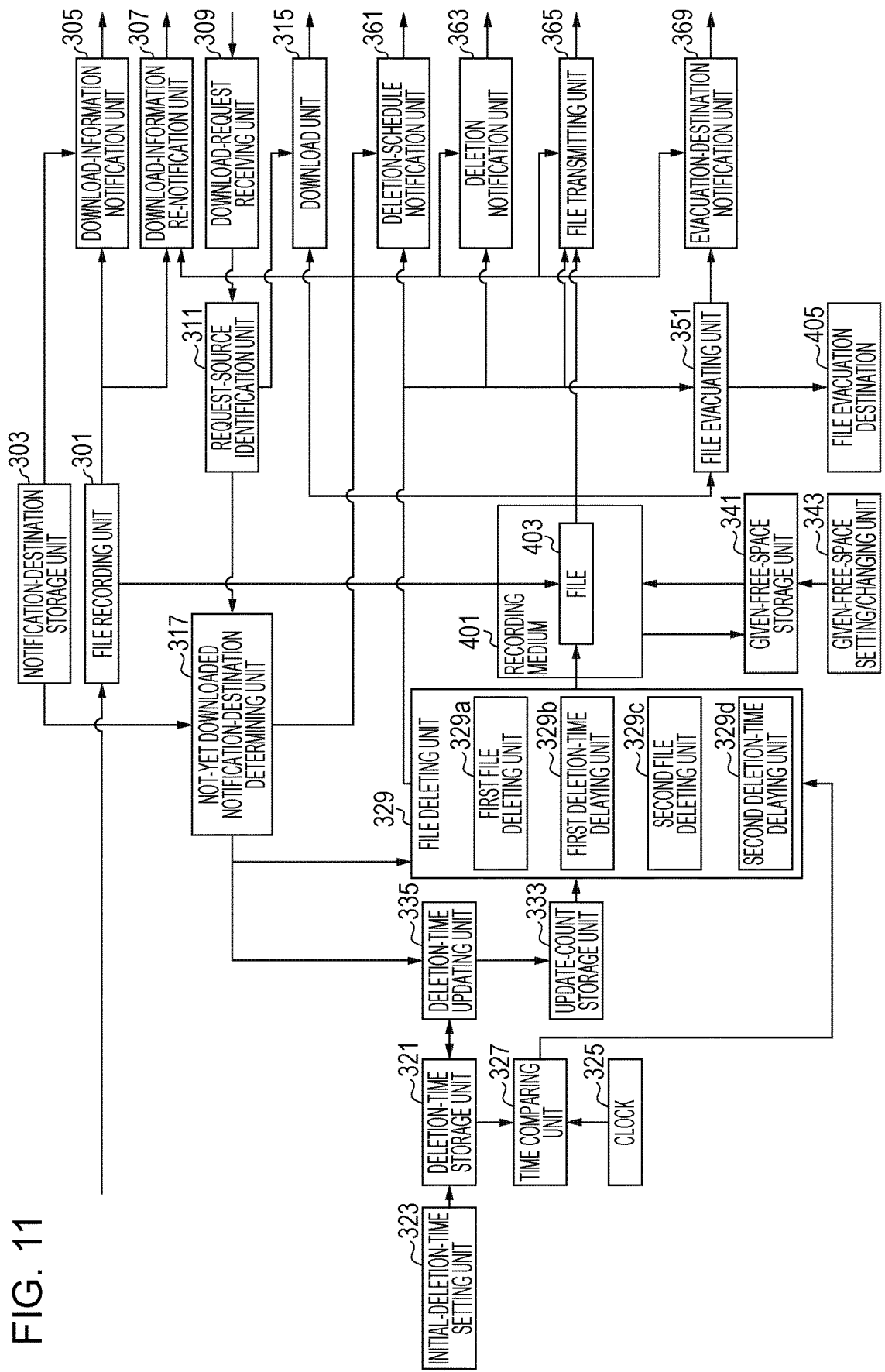
FIG. 11 is a functional block diagram illustrating the configuration of a file management apparatus for performing the file management methods according to embodiments of the present disclosure.

FIG. 11 is a functional block diagram illustrating the configuration of a file management apparatus for performing the file management methods according to the first to eleventh embodiments.

Referring to FIG. 11, the file management apparatus includes a file recording unit 301, a notification-destination storage unit 303, a download-information notification unit 305, a download-information re-notification unit 307, a download-request receiving unit 309, a request-source identification unit 311, a download unit 315, a not-yet downloaded notification-destination determining unit 317, a deletion-time storage unit 321, an initial-deletion-time setting unit 323, a clock 325, a time comparing unit 327, a file deleting unit 329, an update-count storage unit 333, a deletion-time updating unit 335, a given-free-space storage unit 341, a given-free-space setting/changing unit 343, a file evacuating unit 351, a deletion-schedule notification unit 361, a deletion notification unit 363, a file transmitting unit 365, and an evacuation-destination notification unit 369.

The file recording unit 301 records an input file in a recording medium 401 as a file 403.

The notification-destination storage unit 303 stores information about not destinations having been notified of download information for downloading the file 403 from the recording medium 401. There are one or more notification destinations with respect to one file 403.

The download-information notification unit 305 notifies the notification destinations, which are stored in the notification-destination storage unit 303, of the download information.

The download-information re-notification unit 307 notifies again notification destinations, which are among the notification destinations stored in the notification-destination storage unit 303 and which have not downloaded the file 403 from the recording medium 401, of the download information based on determination performed by the not-yet downloaded not determining unit 317.

The download-request receiving unit 309 receives a download request from a notification destination having been notified of the download information.

The request-source identification unit 311 identifies a request source, which has transmitted the download request. The request source is any of the notification destinations having been notified of the download information.

The download unit 315 causes a request source, which has transmitted the download request, to download the file 403 from the recording medium 401.

The not-yet downloaded notification-destination determining unit 317 determines download-information notification destinations which have not downloaded the file 403, based on the download-information notification destinations stored in the notification-destination storage unit 303, and the request sources of download requests which are identified by the request-source identification unit 311.

The deletion-time storage unit 321 stores a scheduled time (referred to as a "deletion time") at which the file 403 is to be deleted from the recording medium 401.

The initial-deletion-time setting unit 323 sets the initial value of the deletion time.

The clock 325 measures date and time.

The time comparing unit 327 determines whether or not the deletion time has come based on the deletion time stored in the deletion-time storage unit 321 and the date and time measured by the clock 325.

The file deleting unit 329 includes a first file deleting unit 329a, a first deletion-time delaying unit 329b, a second file deleting unit 329c, and a second deletion-time delaying unit 329d.

Based on the time determination performed by the time comparing unit 327 and the determination performed by the not-yet downloaded notification-destination determining unit 317, the first file deleting unit 329a deletes the file 403 from the recording medium 401 if the state occurring when the deletion time has come satisfies a given condition.

The first deletion-time delaying unit 329b delays the file deletion time at which the first file deleting unit 329a is to delete the file 403.

The second file deleting unit 329c deletes the file 403 from the recording medium 401 when the free space of the recording medium 401 is below a given amount of free space.

The given-free-space storage unit 341 stores the given amount of free space.

The second deletion-time delaying unit. 329d delays file deletion time at which the second file deleting unit 329c is to delete the file 403.

The update-count storage unit 333 stores the number of updates of the deletion time which are performed by the deletion-time updating unit 335.

Based on the time determination performed by the time comparing unit 327 and the determination performed by the not-yet downloaded notification-destination determining unit 317, the deletion-time updating unit 335 updates the deletion time if the state occurring when the deletion time has come satisfies a given condition.

The given-free-space setting/changing unit 343 sets or changes the given amount of free space.

The file evacuating unit 351 evacuates the file 403 to a file evacuation destination 405 before the file 403 is deleted from the recording medium 401.

The deletion-schedule notification unit 361 transmits a notification that the file 403 is scheduled to be deleted from the recording medium 401 at the deletion time.

The deletion notification unit 363 transmits notification that the second file deleting unit 329c scheduled to delete the file 403 from the recording medium 401.

The file transmitting unit 365 transmits the file 403 recorded in the recording medium 401.

The evacuation-destination notification unit 369 transmits information for identifying the location, in the file evacuation destination 405, where the file 403 has been evacuated.

The file management apparatus according to the embodiments may be provided in a typical information processing apparatus or a special-purpose information processing apparatus.

Thirteenth Embodiment

Figure 12:
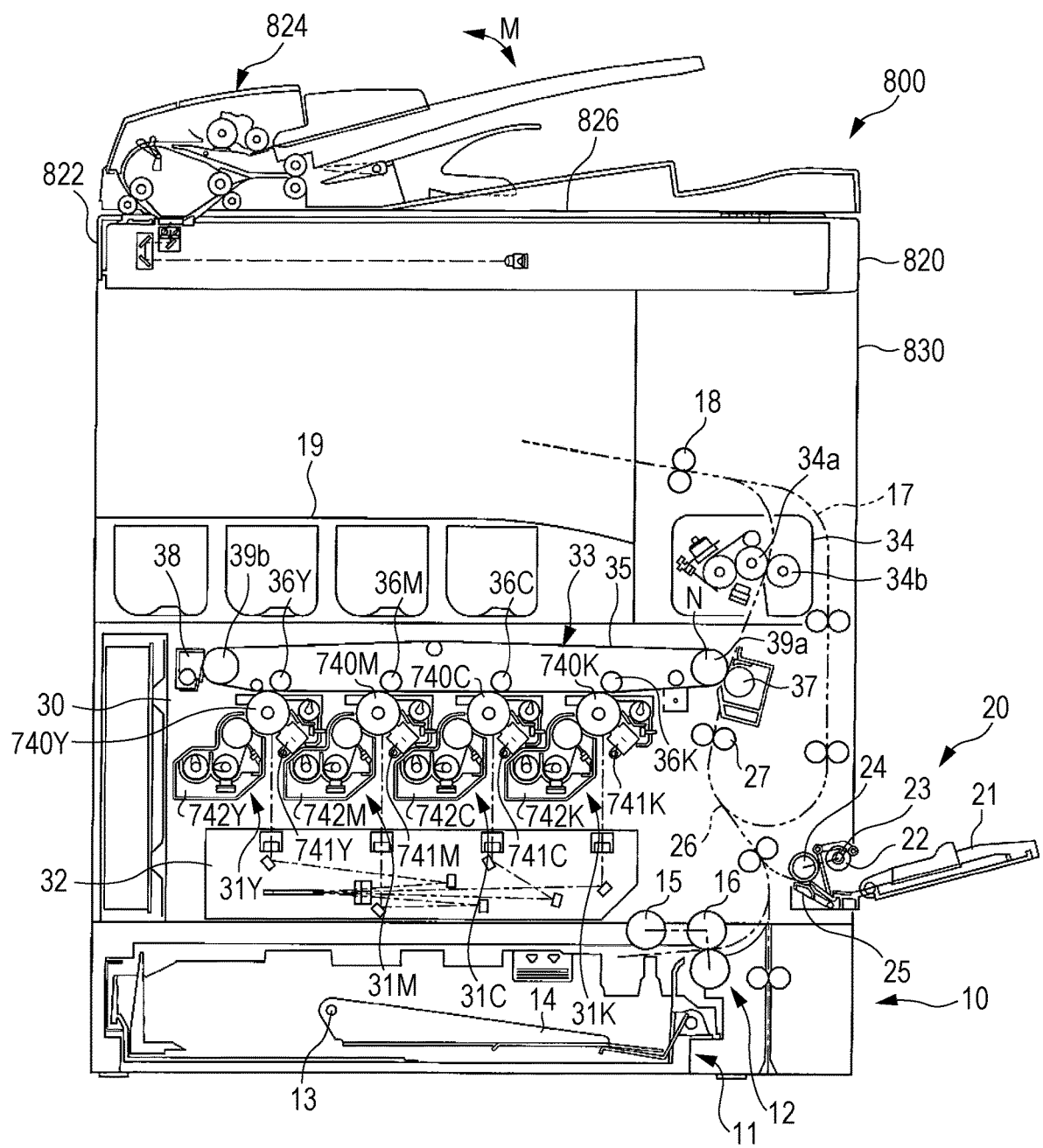
FIG. 12 is a conceptual sectional view of a multifunction device according to a thirteenth embodiment of the present disclosure.
Figure 13:
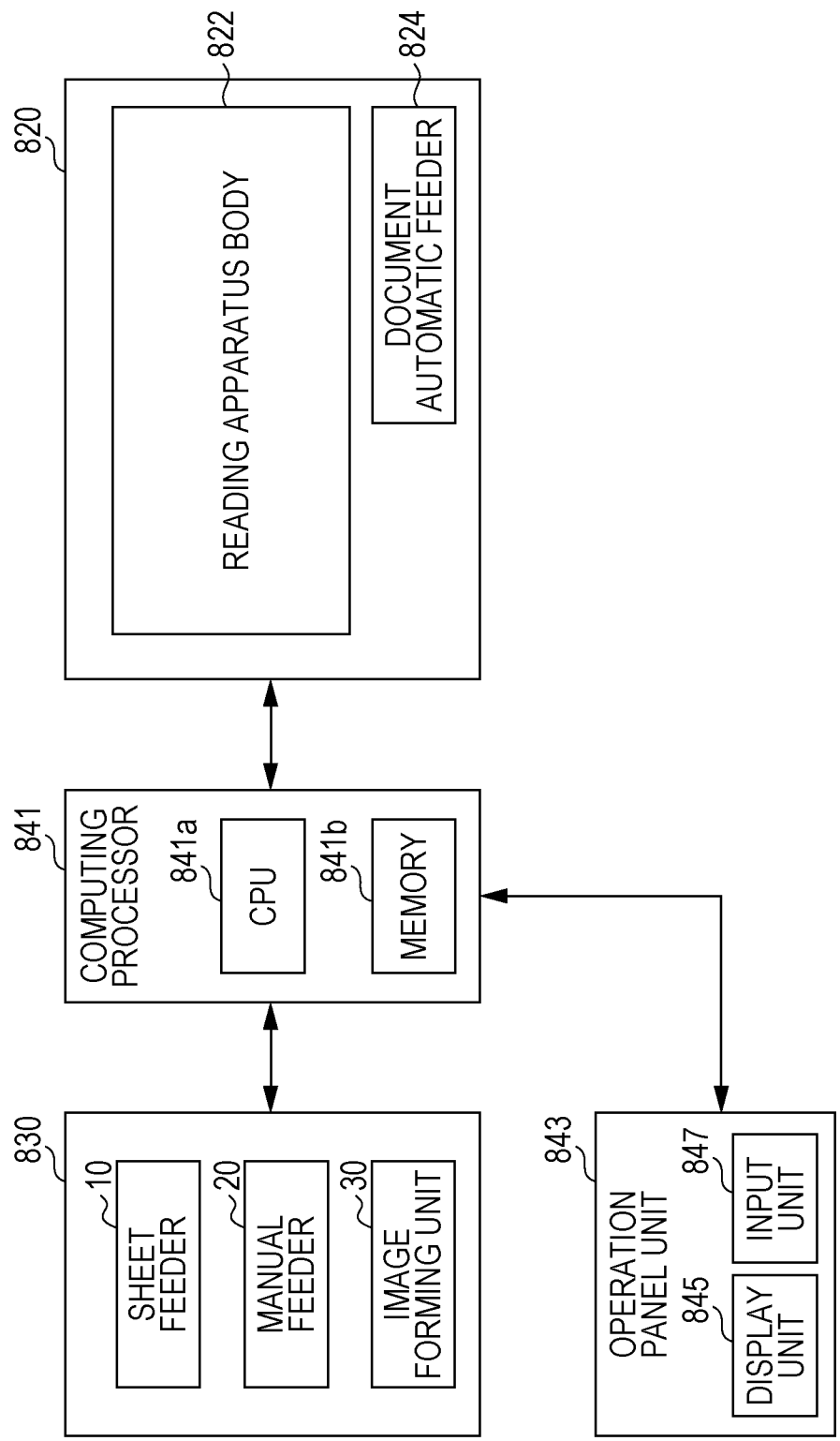
FIG. 13 is a functional block diagram illustrating the multifunction device according to the thirteenth embodiment of the present disclosure.

A thirteenth embodiment describes a multifunction device 800 including the file management apparatus according to the twelfth embodiment for performing the file management methods according to the first to eleventh embodiments. FIGS. 12 and 13 illustrate the configuration and the like of the multifunction device 800.

As illustrated in FIGS. 12 and 13, the multifunction device 800 includes a document reading apparatus 820 that reads a document image, a multifunction device body (image forming unit body) 830 that forms an image on a sheet, an operation panel unit 843 for operating the document reading apparatus 620 and the multifunction device body 830, and a computing processor 841 that controls the document reading apparatus 820 and the multifunction device body 830 based on operations on the operation panel unit 843.

In addition to single use of the document reading apparatus 820 for reading an image and single use of the multifunction device body 830 for forming an image, the document reading apparatus 820 and the multifunction device body 830 may operate in conjunction with each other in order to copy an image. The multifunction device 800 may include a storage device and a facsimile (not illustrated). The storage device may store images obtained through reading performed by the document reading apparatus 820 and images received by the facsimile. The facsimile may transmit images obtained through reading performed by the document reading apparatus 820 and images stored in the storage device, and may receive images from the outside. Further, the multifunction device 800 may include an interface for connection to personal computers over a network. The personal computers connected to the multifunction device 800 may perform the functions of the multifunction device on the data managed by the personal computers.

The document reading apparatus 820 includes a document automatic single pass feeder (SPF) 824 that feeds a document automatically, and a reading apparatus body 822 that reads a document image. In addition to the components illustrated in FIG. 13, the document reading apparatus 820 includes the components which are not illustrated in FIG. 13 but which are illustrated in FIG. 12. As illustrated in FIG. 12, the reading apparatus body 822 includes a document table 826.

The multifunction device body 830 includes a sheet feeder 10 that feeds a sheet, a manual feeder 20 that may feed a sheet manually, and an image forming unit 30 that forms an image on a sheet fed by the sheet feeder 10 or the manual feeder 20.

The sheet feeder 10 includes a sheet stacking unit 11 in which sheets are stacked, and a single-sheet feeding unit 12 that feeds sheets, which are stacked in the sheet stacking unit 11, separately one by one. The sheet stacking unit 11 includes an intermediate plate 14 that rotates around a rotational shaft 13, and the intermediate plate 14 shifts sheets upwards by rotating when a sheet is to be fed. The single-sheet feeding unit 12 includes a pickup roller 15 that feeds a sheet shifted by the intermediate plate 14, and a separation roller pair 16 that separates the sheets, which are fed by the pickup roller 15, one by one.

The manual feeder 20 includes a manual feed tray 21 on which sheets may be stacked, and a single-sheet feeding unit 22 that feeds the sheets, which are stacked on the manual feed tray 21, separately one by one. The manual feed tray 21 is rotatably supported by the multifunction device body 830. When sheets are fed manually, the sheets may be stacked on the manual feed tray 21 fixed at a given angle. The single-sheet feeding unit 22 includes a pickup roller 23 that feeds a sheet stacked on the manual feed tray 21, and a separation roller 24 and a separation pad 25 that separate the sheets, which are fed by the pickup roller 23, one by one.

The image forming unit 30 includes four process cartridges 31Y to 31K for forming images of yellow (Y), magenta (M), cyan (C), and black (K), photoreceptor drums 740Y to 740K described below, an exposure apparatus 32 that exposes the surfaces of the photoreceptor drums 740Y to 740K to light, a transfer unit 33 that transfers, onto a sheet, the toner images formed on the surfaces of the photoreceptor drums 740Y to 740K, and a fixing unit 34 that fixes the transferred toner images onto the sheet. The alphabets (Y, M, C, and K) appended to the reference numerals indicate the respective colors (yellow, magenta, cyan, and black).

The four process cartridges 31Y to 31K are removable from the multifunction device body 830 so as to be replaceable. The four process cartridges 31Y to 31K have a similar configuration except that the colors of the formed images are different from each other. Therefore, only the configuration of the process cartridge 31Y which forms a yellow (Y) image will be described, and the process cartridges 31M to 31K not be described.

The process cartridge 31Y includes the photoreceptor drum 740Y serving as an image carrier, a charger 741Y for charging the photoreceptor drum 740Y, a developing apparatus 742Y that develops an electrostatic latent image formed on the photoreceptor drum 740Y, and a drum cleaner that removes toner remaining on the surface of the photoreceptor drum 740Y. The developing apparatus 742Y includes a developing apparatus body (not illustrated in detail) that performs a developing operation on the photoreceptor drum 740Y, and a toner cartridge (not illustrated in detail) that supplies tanner to the developing apparatus body.

The toner cartridge is removable from the developing apparatus body. When no accommodated tanner remains, the toner cartridge may be removed from the developing apparatus body for replacement.

The exposure apparatus 32 includes a light source (not illustrated) that emits laser light, multiple mirrors (not illustrated) that guide the laser light to the photoreceptor drums 740Y to 740K. The transfer unit 33 includes an intermediate transfer belt 35, first transfer rollers 36Y to 36K, a second transfer roller 37, and a belt cleaner 38. The intermediate transfer belt 35 carries toner images formed on the photoreceptor drums 740Y to 740K. The first transfer rollers 36Y to 36K perform first transfer of the toner images, which are formed on the photoreceptor drums 740Y to 740K, onto the intermediate transfer belt 35. The second transfer roller 37 performs second transfer of the toner images, which have been transferred onto the intermediate transfer belt 35, onto a sheet. The belt cleaner 38 removes toner remaining on the intermediate transfer belt 35. The intermediate transfer belt 35 is stretched between a driving roller 39*a* and a driven roller 39*b*, and is pressed against the photoreceptor drums 740Y to 740K by using the first transfer rollers 36Y to 36K. The second transfer roller 37 nips the intermediate transfer belt 35 in collaboration with the driving roller 39*a*, and transfers the toner images, which are carried by the intermediate transfer belt 35, at the nip portion N onto a sheet. The fixing unit 34 includes a heating roller 34*a* that heats a sheet, and a pressure roller 34*b* that applies pressure to the heating roller 34*a*.

The operation panel unit 843 includes a display unit 845 and an input unit 847. The display unit 845 displays given information. The input unit 847 is a unit through which a user inputs instructions to the document reading apparatus 820 and the multifunction device body 830. In the thirteenth embodiment, the operation panel unit 843 is disposed on the front side of the reading apparatus body 822. The front side corresponds to the near side of FIG. 12. The back side corresponds the rear side of FIG. 12.

As illustrated in FIG. 13, the computing processor 841 includes a CPU 841*a* and a memory 841*b*. The CPU 841*a* controls driving of the sheet feeder 10, the manual feeder 20, the image forming unit 30, and the document reading apparatus 820. The memory 841*b* is used to store various programs for operating the CPU 841*a*, various information used by the CPU 841*a*, and the like. The computing processor 841 integrally controls operations of the sheet feeder 10, the manual feeder 20, the image forming unit 30, and the document reading apparatus 820 based on a user's operations on the operation panel unit 843, and forms an image on a sheet. In particular, the computing processor 841 may function as a file management apparatus through operations using programs which are illustrated in FIG. 11. In addition, the recording medium 401 illustrated in FIG. 11 may be included in the multifunction device 800, or may be included in a separate storage device connected to the multifunction device 800 directly or through a network. When the recording medium 401 is included in the multifunction device 800, the recording medium 401 may occupy a part of the memory 841*b*, or may be a separate unit (not illustrated) different from the memory 841*b*.

An image formation operation (image formation control performed by the computing processor 841) performed by the multifunction device 800 having the above-described configuration will be described. In the thirteenth embodiment, an image formation operation in which the image forming unit 30 forms an image of a read document on a sheet conveyed by the sheet feeder 10 will be described as an example. The read document has been fed by the document automatic feeder 824 and has been read by the reading apparatus body 822.

When a user's input on the input unit 847 of the operation panel unit 843 triggers a signal indicating start of image formation, a read document mounted on the document automatic feeder 824 by the user is automatically fed to the document read position, and the reading apparatus body 822 reads an image at the document read position.

When the reading apparatus body 822 reads an image of the document, the exposure apparatus 32 emits multiple laser beams, which correspond to the photoreceptor drums 740Y to 740K, to the photoreceptor drums 740Y to 740K based on the image information about the read document. At that time, the photoreceptor drums 740Y to 740K have been charged in advance by the respective chargers 741Y to 741K. Laser in corresponding to the respective photoreceptor drums 740Y to 740K are emitted. Thus, the electrostatic latent images are formed on the respective photoreceptor drums 740Y to 740K. After that, the developing apparatuses 742Y to 742K develop electrostatic latent images formed on the respective photoreceptor drums 740Y to 740K. Yellow (Y), magenta (M), cyan (C), black (K) toner images are formed on the photoreceptor drums 740Y to 740K. The toner images of the colors formed on the photoreceptor drums 740Y to 740K are transferred onto the intermediate transfer belt 35 by using the first transfer rollers 36Y to 36K so as to be superimposed on each other. The toner image (a full color toner image) obtained through the superimposition transfer is conveyed to the nip portion N while being carried on the intermediate transfer belt 35.

In parallel with the image formation operation described above, while being separated from each other one by one by the single-sheet feeding unit 12, sheets loaded in the sheet stacking unit 11 are conveyed to a sheet conveying path 26 by using the pickup roller 15. A registration roller pair 27 located upstream of the nip portion N in the sheet conveying direction corrects the oblique orientation of the sheet, and the sheet is conveyed to the nip portion N at a given conveying timing. The full color toner image carried on the intermediate transfer belt 35 is transferred by using the second transfer roller 37 onto the sheet having been conveyed to the nip portion N.

The sheet onto which the toner image has been transferred is heated and pressed by The fixing unit 34. Thus, the toner image is fused and fixed. The sheet is discharged to the outside of the apparatus by using a discharge roller pair 18. The sheet having been discharged to the outside of the apparatus is loaded on a discharged-sheet stacking unit 19.

When images are to be formed on the double sides (the first and second sides) of a sheet, before the sheet on which an image has been formed on the first side is discharged to the outside of the apparatus, the discharge roller pair 18 is rotated in the opposite direction. Thus, the sheet is conveyed to a duplex conveying path 17, and is conveyed again to the image forming unit 30 through the duplex conveying path 17. Then, similarly to the first side, an image is formed on the second side, and is discharged to the outside of the apparatus. The sheet having been discharged to the outside of the apparatus is loaded on the discharged-sheet stacking unit 19.

The file management apparatus described above may be implemented through hardware, software, or a combination of these. The file management method performed by the above-described file management apparatus may be also implemented through hardware, software, or a combination of these. Implementation through software means implementation through a computer reading programs for execution.

The programs stored by using various types of non-transitory computer readable media may be provided for a computer. Non-transitory computer readable media include various types of tangible storage media. Examples of a non-transitory computer readable medium include a magnetic recording medium (for example, a flexible disk, a magnetic tape, or a hard disk drive), a magneto-optical recording medium (for example, a magneto-optical disk), a compact disc-read-only memory (CD-ROM), a CD recordable (CD-R), a CD rewritable (CD-R/W), and a semiconductor memory (for example, a mask ROM, a programmable ROM (PROM), an erasable programmable ROM (EPROM), a flash ROM, or a random access memory (RAM)). In addition, the programs may be supplied to a computer through various types of transitory computer readable media. Examples of a transitory computer readable medium include an electric signal, an optical signal, and an electromagnetic wave. A transitory computer readable medium may be used to supply programs to a computer through a wired channel, such as an electric wire and an optical fiber, or a wireless channel.

The present disclosure may be used in file management.

The present disclosure contains subject matter related to that disclosed in Japanese Priority Patent Application JP 2017-178500 filed in the Japan Patent Office on Sep. 19, 2017, the entire contents of which are hereby incorporated by reference.

The present disclosure may be implemented in various different forms without departing from the spirit and the characteristics of the present disclosure. Therefore, the embodiments described above are merely exemplary, and are not to be interpreted restrictively. The scope of the present disclosure is indicated by the claims, and is not restricted by the specification description body. Further, changes and modifications belonging to the scope equivalent to the claims are included in the scope of the present disclosure.

What is claimed is:

1. A file management apparatus causing at least one notification destination to download a file recorded in a recording medium, the downloading being performed in accordance with a request from the at least one notification destination, the at least one notification destination receiving a notification about download information, the apparatus comprising:
   an initial-deletion-time setting unit that sets a given time as an initial value of a deletion time of the file;
   a deletion-time updating unit that updates the deletion time if one or more notification destinations having not downloaded the file are present when the deletion time comes, the one or more notification destinations having not downloaded the file being included in the at least one notification destination; and
   a first file deleting unit that deletes the file under a condition, the condition being that, when the deletion time comes, the one or more notification destinations having not downloaded the file are not present.

2. The file management apparatus according to claim 1, further comprising:
   a first file deletion-time delaying unit that delays a time at which the first file deleting unit is to delete the file, with respect to the deletion time, when the file is deleted under the condition, the condition being that, when the deletion time comes, the one or more notification destinations having not downloaded the file are not present.

3. The file management apparatus according to claim 1, further comprising:
   a second file deleting unit that deletes the file under a condition, the condition being that, when the deletion time comes, even if the one or more notification destinations having not downloaded the file are present, an update count at a previous update has already reached a given count.

4. The file management apparatus according to claim 3, further comprising:
   a download-information re-notification unit that, if the deletion-time updating unit updates the deletion time, the update of this time being an update at which the update count is equal to the given count, transmits a notification about the download information at least to the one or more notification destinations having not downloaded the file.

5. The file management apparatus according to claim 3, further comprising:
   a deletion-schedule notification unit that, if the deletion-time updating unit updates the deletion time, the update of this time being an update at which the update count is equal to the given count, notifies at least the one or more notification destinations having not downloaded the file that the file is scheduled to be deleted at the deletion time, the deletion time having been updated in the update of this time.

6. The file management apparatus according to claim 3, further comprising:
   a first file evacuating device that evacuates the file to an evacuation destination before the second file deleting unit deletes the file under the condition, the condition being that, when the deletion time comes, even if the one or more notification destinations having not downloaded the file are present, the update count at the previous update has already reached the given count.

7. The file management apparatus according to claim 6, further comprising:
   an evacuation-destination notification unit that notifies at least the one or more notification destinations having not downloaded the file of the evacuation destination.

8. The file management apparatus according to claim 3, further comprising:
   a first file transmitting device that, before the second file deleting unit deletes the file under the condition, transmits the file at least to the one or more notification destinations having not downloaded the file, the condition being that, when the deletion time comes, even if the one or more notification destinations having not downloaded the file are present, the update count at the previous update has already reached the given count.

9. The file management apparatus according to claim 3, further comprising:
   a second file deletion-time delaying unit that delays a time at which the second file deleting unit is to delete the file, with respect to the deletion time, when the file is deleted under the condition, the condition being that, when the deletion time comes, even if the one or more notification destinations having not downloaded the file are present, the update count at the previous update has already reached the given count.

10. The file management apparatus according to claim 1, further comprising:

a third file deleting device that deletes the file under a condition, the condition being that, when the deletion time comes, even if the one or more notification destinations having not downloaded the file are present, a free space of the recording medium is below a given amount of free space.

11. The file management apparatus according to claim 10, further comprising:
a given-free-space setting/changing unit that sets or changes the given amount of free space.

12. The file management apparatus according to claim 10, further comprising:
a second file evacuating device that, before the third file deleting device deletes the file, evacuates the file under the condition, the condition being that, when the deletion time comes, even if the one or more notification destinations having not downloaded the file are present, the free space of the recording medium is below the given amount of free space.

13. The file management apparatus according to claim 10, further comprising:
a deletion notification unit that, before the third file deleting device deletes the file, notifies at least the one or more notification destinations having not downloaded the file that the file is to be deleted, the notification being performed under the condition, the condition being that, when the deletion time comes, even if the one or more notification destinations having not downloaded the file are present, the free space of the recording medium is below the given amount of free space.

14. The file management apparatus according to claim 10 further comprising:
a second file transmitting device that transmits the file at least to the one or more notification destinations having not downloaded the file, the transmission being performed under the condition, the condition being that, when the deletion time comes, even if the one or more notification destinations having not downloaded the file are present, the free space of the recording medium is below the given amount of free space.

15. The file management apparatus according to claim 1, wherein the units operate based on a download state of a specific type of notification destination among the at least one notification destination.

16. The file management apparatus according to claim 1, further comprising:
a file recording unit that records the file in a given area in the recording medium.

17. The file management apparatus according to claim 1, further comprising:
a download-information notification unit that notifies a plurality of notification destinations of the download information, the at least one notification destination comprising the plurality of notification destinations, the download information being information for downloading the file from the recording medium.

18. The file management apparatus according to claim 1, further comprising:
a downloading device that causes a notification destination to download the file, the notification destination having requested the download based on the download information, the notification destination being included in the at least one notification destination.

19. The file management apparatus according to claim 1, wherein the given time indicates a time at which the file is recorded in the recording medium, or a time at which a given period has elapsed after the file is made downloadable.

20. A multifunction device comprising the file management apparatus according to claim 1.

21. An information processing apparatus comprising the file management apparatus according to claim 1.

22. A non-transitory computer-readable medium storing a file management program causing a computer to function as the file management apparatus according to claim 1.

23. A file management method for causing at least one notification destination to download a file recorded in a recording medium, the downloading being performed in accordance with a request from the at least one notification destination, the at least one notification destination receiving a notification about download information, the method comprising:
setting a given time as an initial value of a deletion time of the file;
updating the deletion time if one or more notification destinations having not downloaded the file are present when the deletion time comes, the one or more notification destinations having not downloaded the file being included in the at least one notification destination; and
deleting the file under a condition, the condition being that, when the deletion time comes, the one or more notification destinations having not downloaded the file are not present.

* * * * *